(12) United States Patent
Wakazono et al.

(10) Patent No.: US 6,301,874 B1
(45) Date of Patent: *Oct. 16, 2001

(54) COMBINED CYCLE POWER PLANT WITH STEAM-COOLED GAS TURBINE

(75) Inventors: Osamu Wakazono; Hideo Kimura; Yasushi Fukuizumi, all of Takasago (JP)

(73) Assignee: Mitsubishi Heavy Industries, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/381,613

(22) PCT Filed: Jan. 23, 1998

(86) PCT No.: PCT/JP98/00258

§ 371 Date: Sep. 23, 1999

§ 102(e) Date: Sep. 23, 1999

(87) PCT Pub. No.: WO99/37889

PCT Pub. Date: Jul. 29, 1999

(51) Int. Cl.[7] ..................................................... F02C 6/18
(52) U.S. Cl. ...................................... 60/39.182; 60/39.75
(58) Field of Search ............................... 60/39.182, 39.75

(56) References Cited

U.S. PATENT DOCUMENTS

| 4,424,668 | * | 1/1984 | Mukherjee | 60/39.182 |
| 5,577,377 | * | 11/1996 | Tomlinson | 60/39.182 |
| 5,613,356 | * | 3/1997 | Frutschi | 60/39.182 |

FOREIGN PATENT DOCUMENTS

| 5-163960 A | 6/1993 | (JP) . |
| 9-4417 A | 1/1997 | (JP) . |
| 9-112214 A | 4/1997 | (JP) . |
| 9-189236 A | 7/1997 | (JP) . |
| 9-280010 A | 10/1997 | (JP) . |

* cited by examiner

Primary Examiner—Louis J. Casaregola
(74) Attorney, Agent, or Firm—Oblon, Spivak, McClelland, Maier & Neustadt, P.C.

(57) ABSTRACT

A combined cycle power plant is disclosed, whose target high-temperature portion in the gas turbine can be reliably and sufficiently cooled, and in which the heat generated via the cooling can be reliably recovered, thereby improving the efficiency. Here, the exhaust gas from the high-pressure turbine is introduced as cool steam to the steam cooling system for cooling the target high-temperature portion in the gas turbine. This cooling process is efficiently and suitably performed by using the characteristic of the above high-pressure exhaust gas relating to quantity, pressure, or temperature.

5 Claims, 2 Drawing Sheets

COMBINED CYCLE POWER PLANT WITH STEAM-COOLED GAS TURBINE

TECHNICAL FIELD

The present invention relates to a combined cycle power plant including combined gas and steam turbine plants.

BACKGROUND ART

The combined cycle power plant is a power generation system which has combined gas and steam turbine plants. In this system, the gas turbine takes charge of a higher-temperature range of the thermal energy, while the steam turbine takes charge of the remaining lower-temperature range, thereby efficiently recovering and using the thermal energy. This is currently the most common power generation system.

In order to improve the efficiency, the development of the combined cycle power plant has been focused on how high the higher-temperature range can be set.

To realize a higher-temperature range, a cooling system must be provided in consideration of the heat resistance of the turbine structure. Conventionally, air is used as a cooling medium in such a cooling system.

However, as long as air is used as the cooling medium, even if a desirable higher-temperature range can be achieved, the plant will inevitably suffer from (i) loss of power necessary for boosting the air (which was used for cooling) up to a specified pressure by using an internal air compressor, and (ii) lowering of the average gas temperature and thus the energy of the gas because the air used for cooling target portions is finally made flow through the passage (in the turbine) together with the high-temperature gas. As a result of the above effects (i) and (ii), it is very difficult to further improve the thermal efficiency.

In order to solve the above problem and to further improve the efficiency, another type of combined cycle power plant has been proposed, in which the steam is used as the cooling medium of the gas turbine instead of air as mentioned above. Japanese Unexamined Patent Application, First Publication, No. Hei 5-163960 discloses an example thereof. The general structure of the disclosed power plant is shown in FIG. 2.

That is, the combined cycle power plant 10 comprises (i) gas turbine plant 11 mainly including gas turbine 13, air compressor 18, and combustor 19, (ii) exhaust heat recovery boiler 14, mainly comprising high-pressure drum 20, medium-pressure drum 21, and low-pressure drum 22, which uses the exhaust gas from the gas turbine plant 11 as a heat source, and (iii) steam turbine plant 12 mainly comprising high-pressure turbine 15a, medium-pressure turbine 15b, and low-pressure turbine 15c to which the steam is supplied from the exhaust heat recovery boiler 14.

The cooling system employed here is steam cooling system 50 in which the medium-pressure steam from the medium-pressure drum 21 of the exhaust heat recovery boiler 14 is introduced as the cooling steam via steam supply path 51 into steam cooling section 52 provided in a higher-temperature portion to be cooled in gas turbine 13. That is, the above higher-temperature portion is cooled, and thus the above cooling steam is heated and obtains energy. The cooling steam is then supplied via steam recovery system 53 to the medium-pressure turbine 15b of the steam turbine plant 12. That is, the steam can be efficiently recovered.

Here, steam section 60 is a backup section, and the backup steam can be supplied from the high-pressure drum 20 of the exhaust heat recovery boiler 14 via high-pressure steam line 42. This backup section is used immediately after the gas turbine 13 is activated.

As explained above, the conventional system uses the medium-pressure steam obtained from the medium-pressure drum 21 as the cooling steam; thus, the temperature at the inlet of the gas turbine is further increased or the target high-temperature portion or area to be cooled in the gas turbine is extended. That is, the extended high-temperature portion to be cooled may include moving blades, stationary blades, and further the circular portion of the turbine. As the area to be cooled extends, the heat load of the area increases and the cooling capability of the medium-pressure steam decreases and becomes insufficient because the amount of the steam generated by the exhaust heat recovery boiler is limited. Accordingly, the original objective to sufficiently and reliably cool the target high-temperature portion cannot be achieved.

It is an object of the present invention to solve the above problems in the conventional system, and to provide a combined cycle power plant, whose target high-temperature portion in the gas turbine can be reliably and sufficiently cooled, and in which the heat generated via the cooling can be reliably recovered, thereby improving the efficiency.

DISCLOSURE OF INVENTION

To achieve the above object, the present invention provides a combined cycle power plant having a gas turbine plant and a steam turbine plant combined together, the power plant comprising:

an exhaust heat recovery boiler for generating steam for driving the steam turbine by using exhaust heat from the gas turbine; and a steam cooling system for cooling a target high-temperature portion in the gas turbine by using steam, where superheated steam from the steam cooling system is recovered and used in the steam turbine, and wherein the steam turbine plant comprises at least a high-pressure turbine and a low-pressure turbine, wherein an exhaust gas from the high-pressure turbine is introduced into the steam cooling system.

Accordingly, the exhaust gas from the high-pressure turbine is used as cool steam introduced to the steam cooling system for cooling the target high-temperature portion in the gas turbine. This high-temperature portion to be cooled is efficiently and suitably cooled by using the characteristic of the high-pressure exhaust gas relating to quantity, pressure, or temperature.

The present invention also provides a combined cycle power plant having a gas turbine plant and a steam turbine plant combined together, the power plant comprising:

an exhaust heat recovery boiler for generating steam for driving the steam turbine by using exhaust heat from the gas turbine; and a steam cooling system for cooling a target high-temperature portion in the gas turbine by using steam, where superheated steam from the steam cooling system is recovered and used in the steam turbine, and wherein the steam turbine plant comprises at least a high-pressure turbine and a low-pressure turbine, wherein an exhaust gas from the high-pressure turbine is introduced into the steam cooling system and the exhaust gas output from the steam cooling system is then directly supplied to the following steam turbine.

In this case, the exhaust gas from the high-pressure turbine, which is determined as cool steam introduced to the steam cooling system for cooling the target high-temperature portion in the gas turbine, carries out a specified function, and is then directly supplied to the following steam turbine such as the medium-pressure turbine without flowing into another device such as a reheater of the boiler. The supplied steam can perform a specified function in the steam turbine.

The exhaust heat recovery boiler may employ a pressure system of at least three stages such as high pressure, medium pressure, and low pressure. In this case, the target high-temperature portion in the gas turbine is cooled by using the high-pressure exhaust gas from the high-pressure turbine, and the exhaust gas is then introduced into the medium-pressure turbine. Therefore, even if the exhaust heat recovery boiler employs the three-stage (high, medium, and low) pressure system, a reheater can be omitted.

It is possible that the exhaust gas from the high-pressure turbine is branched off into parallel flows along a plurality of elements to be cooled of the target high-temperature portions. That is, the high-pressure exhaust gas from the high-pressure turbine is branched off so as to flow along parallel-arranged elements of the high-pressure portion to be cooled. Therefore, the pressure loss with respect to a target path relates only to a flow branch which flows along the target path.

MODES FOR CARRYING OUT THE INVENTION

Figure 1:
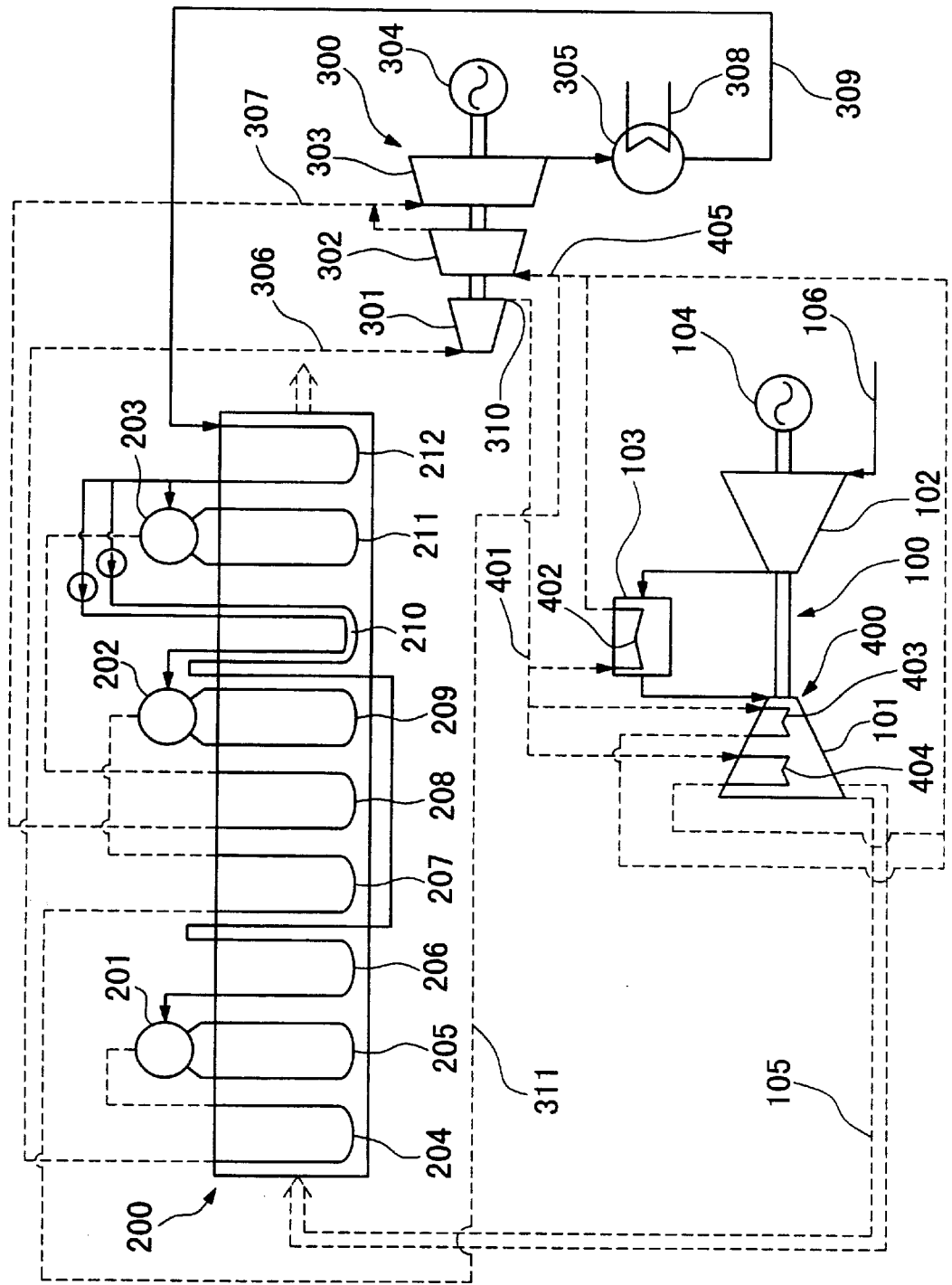
FIG. 1 is a system diagram of the combined cycle power plant as an embodiment according to the present invention.
Figure 2:
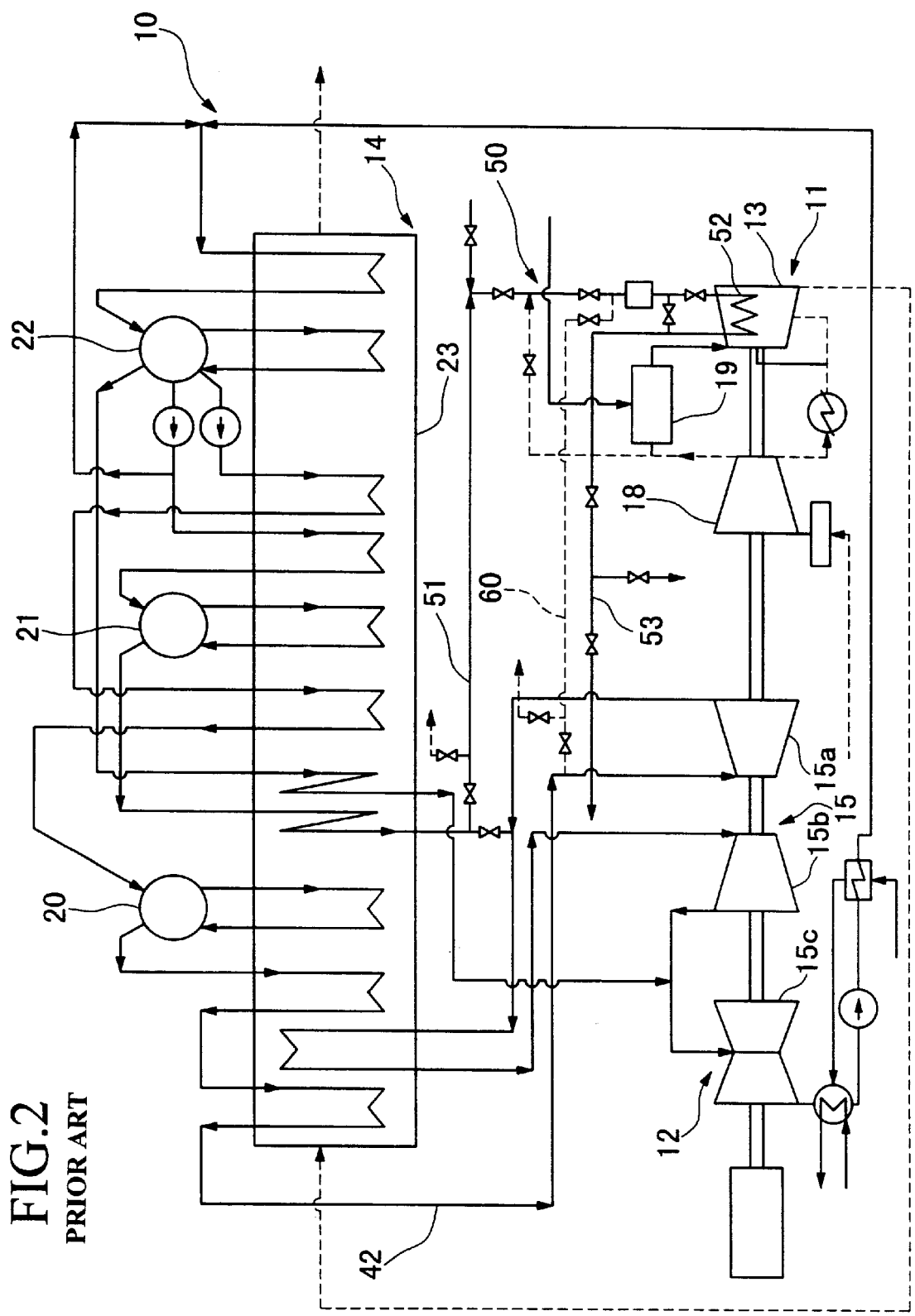
FIG. 2 is a system diagram of a conventional combined cycle power plant.

Hereinbelow, an embodiment of the present invention will be explained in detail with reference to FIG. 1.

In the figure, reference numeral 101 indicates a gas turbine, reference numeral 102 indicates an air compressor driven by the gas turbine 101, and reference numeral 103 indicates a combustor which makes the compressed air (supplied from the air compressor 102) combust using a fuel so as to drive the gas turbine 101. Reference numeral 104 indicates a (power) generator, which is driven together with the air compressor 102. The above gas turbine 101, air compressor 102, combustor 103, and generator 104 constitute gas turbine plant 100.

The exhaust gas from the gas turbine 101 is introduced via exhaust duct 105 into exhaust heat recovery boiler 200. This heat recovery boiler 200 comprises high-pressure superheater 204, high-pressure evaporator 205, high-pressure economizer 206, medium-pressure superheater 207, low-pressure superheater 208, medium-pressure evaporator 209, medium-pressure economizer 210, low-pressure evaporator 211, low-pressure economizer 212, high-pressure drum 201, medium-pressure drum 202, and low-pressure drum 203, where the three drums respectively join with the high-pressure evaporator 205, medium-pressure evaporator 209, and low-pressure evaporator 211. Here, the above exhaust gas is used as a heat source so as to generate three kinds of steam at high, medium, and low pressure values.

Reference numerals 301, 302 and 303 respectively indicate high-, and medium-, and low-pressure turbines. The high-pressure turbine 301 is driven using high-pressure steam supplied from the high-pressure superheater 204 of the exhaust heat recovery boiler 200 via high-pressure steam supply line 306, while the low-pressure turbine 303 is driven using mixed steam including (i) low-pressure steam supplied from the low-pressure superheater 208 of the exhaust heat recovery boiler 200 via low-pressure steam line 307 and (ii) the exhaust gas from the medium-pressure turbine 302 explained below.

The medium-pressure turbine 302 does not only depend on the medium-pressure steam supplied from the exhaust heat recovery boiler 200 via medium-pressure steam line 311, but is also driven by using the high-pressure steam whose major constituent is supplied from the high-pressure turbine 301 via the steam recovery section 405. The latter, i.e., the high-pressure exhaust gas, is mainly used here.

These high-pressure, medium-pressure, and low-pressure turbines 301, 302, and 303 are directly combined via a shaft, together with generator 304. This combined portion and condenser 305 connected with the low-pressure turbine 303 constitute the steam turbine plant 300.

Reference numeral 401 indicates a cool steam (i.e., used for cooling) supply system, which is connected with exhaust vent 310 of the high-pressure turbine 301 so as to receive the exhaust gas from the turbine 301. Reference numeral 402 indicates the first steam cooling section, branching off from the cool steam supply system 401, for cooling the combustor 103. Reference numerals 403 and 404 respectively indicate the second and third steam cooling sections, which are arranged in parallel with the first steam cooling section 402. They also branch off from the cool steam supply system 401 and cool the target high-temperature portion of the gas turbine 101.

These parallel-arranged first, second, and third steam cooling sections constitute steam cooling system 400. The high-pressure exhaust gas supplied to each cooling section is used as a cooling medium for cooling the target high-temperature portion. These cooling media are then merged again and introduced into the medium-pressure turbine 302 via steam recovery section 405.

In FIG. 1, reference numeral 106 indicates an air supply system for supplying air to the air compressor 102, reference numeral 308 indicates a cooling-water supply system for supplying cooling water to condenser 305, and reference numeral 309 indicates a water supply system through which the condensate (i.e., condensed water) obtained by condenser 305 is supplied to the exhaust heat recovery boiler 200.

That is, according to the present embodiment, when the target high-temperature portion in the gas turbine plant 100 is cooled, substantially all of the high-pressure exhaust gas of the high-pressure turbine is selected as the most-suitable cooling medium from among the high-pressure exhaust gas, medium-pressure exhaust gas, and low-pressure exhaust gas in the steam turbine plant 300, and the high-pressure steam, medium-pressure steam, and low-pressure steam in the exhaust heat recovery boiler 200, in consideration of the necessary quantity, pressure, or temperature. Consequently, a quantity of heat is generated via the cooling of the high-temperature portion (to be cooled) in the gas turbine plant 100, and the heat is supplied to the medium-pressure turbine 302 so that the heat is not discharged to the outside of the system but recovered, thereby improving the thermal efficiency.

Below, the above types of steam obtained by the exhaust heat recovery boiler 200 will be analyzed in turn. The high-pressure steam has a perfect steam flow (that is, the quantity is sufficient) but has a high pressure; thus, the high-temperature portion to be cooled in the gas turbine plant 100 must have a strong structure. Accordingly, the relevant portion must have a greater wall thickness, which not only causes an increase of thermal stress, but also makes the structural design much more complicated and costly.

The medium-pressure steam has an insufficient steam flow in consideration of the quantity necessary for cooling the target high-pressure portion. Therefore, a change of design in the boiler side may be effective to increase the quantity of the medium-pressure steam, but in this case, the efficiency of recovering the exhaust heat at the boiler side is lowered.

Next, generally, the low-pressure steam has a pressure lower than the pressure in the atmosphere around the target high-temperature portion of the gas turbine plant 100. Therefore, in this case, it is impossible to keep the principle relating to the stability of design, such that the high-temperature gas of the gas turbine must be kept from leaking out into the steam system side.

According to the above analysis, it is clear that all types of steam except for the high-pressure exhaust gas are insufficient; furthermore, it has been a significant discovery that the high-pressure exhaust gas is really suitable for cooling the high-temperature portion of the gas turbine plant.

Almost all of the operating steam in the medium-pressure turbine 302 is supplied from the steam cooling system 400 in the gas turbine plant 100; thus, no reheater is necessary in the exhaust heat recovery boiler 200. Generally, the reheater is indispensable to this kind of plant; thus, the cost for designing and manufacturing the plant can be greatly reduced.

If the high-pressure exhaust gas of the high-pressure turbine is directly used, it is preferable that the pressure loss in the portion to be cooled of the gas turbine plant is suppressed as much as possible so that a desirable plant efficiency can be maintained. Therefore, in the portion to be cooled, not only are the first, second, and third steam cooling sections 402, 403, and 404 branched in parallel, but also the steam flows at each element of the target portion to be cooled can be made as parallel as possible. Accordingly, the pressure loss can be suppressed, and it is possible to reduce the danger of overheating due to partial obstruction.

The present invention is not limited to the embodiment explained above, but each element in the embodiment can be variously modified within the scope of the claimed invention.

INDUSTRIAL APPLICABILITY

According to the present invention explained above, the high-pressure exhaust gas is used for cooling the target high-temperature portion of the gas turbine plant because the high-pressure exhaust gas is most suitable from any of the viewpoints of quantity, pressure, and temperature. Accordingly, even if the temperature of the high-pressure portion to be cooled is further increased, or even if the target high-temperature area is extended, the necessary cooling process can be performed. In addition, the high-temperature portion to be cooled can function as a reheater so that no reheater is necessary in the exhaust heat recovery boiler. Therefore, the cost for designing and manufacturing the plant can be greatly reduced.

Also according to the present invention, after the exhaust gas in the high-pressure turbine has carried out a specified function, the gas is directly supplied to the following steam turbine such as the medium-pressure turbine without flowing into another device such as a reheater of the boiler. Therefore, it is obvious that no reheater is necessary in the above-described exhaust heat recovery boiler.

That is, the present invention can employ the exhaust heat recovery boiler of the three-stage (high, medium, and low) pressure system which generally requires a reheater. Therefore, omission of the reheater leads to a great and remarkable cost-reducing effect.

Furthermore, according to the present invention, a plurality of parallel high-temperature portions to be cooled can be targeted, thereby reducing the pressure loss by such portions, and directly and efficiently using the high-pressure exhaust gas of the high-pressure turbine.

What is claimed is:

1. A combined cycle power plant having a gas turbine plant and a steam turbine plant combined together, the power plant comprising:
   an exhaust heat recovery boiler for generating steam for driving the steam turbine by using exhaust heat from the gas turbine; and
   a steam cooling system for cooling a target high-temperature portion in the gas turbine by using steam, where superheated steam from the steam cooling system is recovered and used in the steam turbine, and
   wherein the steam turbine plant comprises at least a high-pressure turbine and a low-pressure turbine, wherein an exhaust gas from the high-pressure turbine is introduced into the steam cooling system, and all the steam generated by the exhaust heat recovery boiler is directly supplied to the steam turbine plant.

2. A combined cycle power plant having a gas turbine plant and a steam turbine plant combined together, the power plant comprising:
   an exhaust heat recovery boiler for generating steam for driving the steam turbine by using exhaust heat from the gas turbine; and
   a steam cooling system for cooling a target high-temperature portion in the gas turbine by using steam, where superheated steam from the steam cooling system is recovered and used in the steam turbine, and
   wherein the steam turbine plant comprises at least a high-pressure turbine and a low-pressure turbine, wherein an exhaust gas from the high-pressure turbine is introduced into the steam cooling system and all the steam generated by the exhaust heat recovery boiler is directly supplied to the steam turbine plant and the exhaust gas output from the steam cooling system is then directly supplied to the following steam turbine.

3. A combined cycle power plant as claimed in claim 1 or 2, wherein the exhaust heat recovery boiler employs a pressure system of at least a high pressure stage, a medium pressure stage, and a low pressure stage.

4. A combined cycle power plant as claimed in claim 1 or 2, wherein the exhaust gas from the high-pressure turbine is branched off into parallel flows along a plurality of elements to be cooled of the target high-temperature portions.

5. A combined cycle power plant as claimed in claim 2, wherein the steam turbine plant comprises a middle-pressure turbine, and the exhaust gas output from the steam cooling system is directly supplied to the middle-pressure turbine of the steam turbine.

* * * * *